United States Patent

[11] 3,622,680

| [72] | Inventor | Joseph Palmieri<br>505 Gibbs Pond Road, Lake Ronkonkoma,<br>Long Island, N.Y. 11779 |
| --- | --- | --- |
| [21] | Appl. No. | 865,311 |
| [22] | Filed | Oct. 10, 1969 |
| [45] | Patented | Nov. 23, 1971 |

[54] DOPPLER RADIO DIRECTION FINDING, TESTING AND TEACHING DEVICE
7 Claims, 4 Drawing Figs.

[52] U.S. Cl. .................................................. 35/10.4,
343/17.7, 343/113 DE
[51] Int. Cl. .................................................. G01s 7/40
[50] Field of Search .......................................... 343/17.7,
113 DE; 35/10.4

[56] References Cited
UNITED STATES PATENTS
| 2,937,456 | 5/1960 | Bollman ....................... | 35/10.4 |
| 3,023,410 | 2/1962 | Hansel ......................... | 343/113 DE UX |

*Primary Examiner*—T. H. Tubbesing
*Attorney*—Eliot S. Gerber

ABSTRACT: An auxiliary device for the testing of doppler radio direction finding equipment may also simulate various navigational situations on that equipment for the purpose of instruction. The testing and instructional device operates from an internal timing circuit of the equipment and is synchronized with it.

INVENTOR
JOSEPH PALMIERI

BY
Eliot S. Gerber
ATTORNEY

1

DOPPLER RADIO DIRECTION FINDING, TESTING AND TEACHING DEVICE

DESCRIPTION

The present invention relates to the navigation of vehicles and more particularly to a testing and instructing device used in connection with doppler radio direction finding equipment.

At the present time, the problem of airplane congestion, particularly at the airports of major cities, has received increased attention. The demand for air travel, particularly during certain periods of the day, and the increased utilization and number of private planes, has resulted in many aircraft seeking to land or take off at airports at about the same time. It is of vital importance for the safety of passengers that the position of the aircraft be exactly determined and known to flight controllers on the ground. Particularly during fog or other inclement weather, it is impossible for the aircraft pilots themselves to visually locate other aircraft in the vicinity. Generally, radar has been utilized for the purpose of guiding aircraft to their landings and during their takeoff. However, radar has its limitations. For example, it may not be wholly dependable under certain atmospheric conditions. In the last few years, an auxiliary navigational system has been adapted in the United States and in certain foreign countries. This auxiliary navigational system depends upon the radio propagation by the moving aircraft which is located as to the source of the propagation by a radio direction finder. The broad classification of radio direction finders has been used for many years in navigation of ships as well as aircraft, for example, by utilizing a radio direction finder with a loop antenna which is turned so as to present different signal strengths in relationship to a fixed propagating station such as a light house in the case of shipping. A more recent development, and one which is used in the navigation of aircraft and the control of the aircraft by the ground stations, is doppler direction finder equipment. The doppler direction finder equipment takes into account the doppler effect, in which the apparent frequency of a received signal is affected by the movement of the vehicle emitting the signal. The doppler effect is simulated by rotation of the receiving antenna, either physically or by electronic switching. The doppler radio direction finders have proven effective, but they have presented certain problems in connection with their testing and instruction. In regard to testing, it is essential that the direction finder be accurate, as any inaccuracies in the equipment may be catastrophic. At the present time there is not commercially available any equipment to test the accuracy of doppler radio direction finder equipment.

It is important that the personnel using the equipment be thoroughly familiar with its operation. The Federal Aviation Authority has recently required that their ground controllers every month perform certain procedures on the doppler radio direction finder equipment so that the ground controllers will be able to accurately operate the equipment. At the present time, however, the instructional devices used present only rough analogies of the equipment and do not present the ground controller with the opportunity to practice on the equipment itself. For example, one instructional system uses two selsins which are connected together, one of which is operated by the ground controllers receiving the instruction and the other of which is intended to represent the slave device. There are presently known two basic types of doppler direction finder equipment, one of which utilizes a physical contact system to simulate the rotation of the receiving antenna dipole, and the other of which is the system used in the United States, utilizing an electronic switching system to simulate the rotation of the receiving dipole antenna. The testing and instructing device of the present invention may be used with either of these systems.

As might be expected, a doppler radio direction finder is a complex piece of equipment and may include many electron tubes and hundreds of transistors and diodes. It includes an antenna, a receiver and usually two or more scope indicators presenting a visual image of the direction of movement of the aircraft. In the antenna electronic switching system a malfunction of one diode is sufficient for the device to give a false bearing.

It is not generally possible to test the equipment with the antenna connected to the receiver, because the exact position of the aircraft cannot often be confirmed instantly by independent means. When the antenna is disconnected from the receiver, the strobes (indicating waveforms) are lost.

It is the objective of the present invention to provide a testing device to determine the operability and accuracy of doppler radio direction finder equipment.

It is a further objective of the present invention to provide an instructing device by which ground controllers or other personnel may receive instruction in, and testing of their ability of operation of, doppler radio direction finding equipment.

It is the further objective of the present invention to produce such a testing device that will (1) produce the appearance of simultaneous bearings to the base and remote indicators when the antenna is disconnected; (2) permit the disconnection of the antenna and yet produce, in the receiver, the normal waveforms and also produce the normal test indications at the various test points of the receiver; (3) check the antenna system while it is connected to the receiver; and (4) establish the appearance of the same bearing in the indicator portion of both receivers, thereby checking both indicators.

In accordance with the present invention, a testing and instruction device for doppler radio direction finder equipment is provided. The device includes, for use in instructing, a voice intercommunication system including a hand-held microphone and loudspeaker. The antennas of the doppler system are rotated, for example, by electronic switching, at a fixed rate, for example, 200 Hz. At the input to the radio direction finder receiver, the signal from the antenna is an FM signal deviated at a 200 cycle rate. When the antenna is disconnected, the input signal, and consequently the visual strobes produced by the receiver, disappear.

The device of the present invention presents its output to the reactance circuit of an FM signal generator. The FM generator is tuned to the operating frequency of the receiver, i.e., the frequency of the normal antenna output signal (200 Hz.). The antenna is disconnected and the FM generator's output is connected to the receiver's input. This results in a controllable strobe presentation at the indicators. However, one cannot simply generate the FM at any 200 cycle rate as the test patterns produced will be uncontrollable because the frequency will not be locked to the rotation rate of the antenna. Consequently, the FM signal is derived from square wave signals at the correct frequency, which are presently generated in the local indicator portion of the radio direction finder receiver. Those square wave signals are locked to the rotation of the antenna. The square wave is converted to a sine wave by the device of the present invention. In addition, the device utilizes phase shift networks to obtain testing of all four quadrants of bearing. The sine wave, with or without phase shifting, is used to frequency modulate an FM signal generator or transmitter. Its output is then applied, with the antenna disconnected, to the input of the receiver. That FM signal, locked to antenna rotation, will produce the appearance of controlled waveforms.

For use in instruction, the device also includes a voice intercommunication set. The instructor, at the receiver and with the antenna disconnected, controls the waveforms by means of phase-shifting the testing FM signal. The controlled waveforms simulate an aircraft. The person being instructed views the simulated waveforms and observes the other indicator to obtain the bearing. The intercommunication system is used to provide voice commands and to simulate conversation with an aircraft.

The device of the present invention, in association with an FM generator, presents to the receiver the same type of input it obtains from the antenna. To the date extractor (a portion of the receiver) it is the same if it is operating from the FM generator or the antenna system. In both cases, it sees an audio frequency equal to the rate of rotation of the antenna dipoles, i.e., 200 Hz., and a phase dependent upon the rotation, or simulated direction by phase-shifting, of the received signal.

Other objectives of the present invention will be apparent from the following detailed description, taken in conjunction with the accompanying drawings, in which.

The doppler radio direction finder maintenance aid and training device is called herein the "simulator." It is an electronic device which is described as being a separate unit connectable to the direction finder "d.f." receiver by plug-in connectors or other connection means. However, the simulator may be incorporated in the same chassis and case as the receiver.

The general form of the simulator will be described (in connection with FIG. 1), its circuit described (in connection with FIG. 2), and its operation as a training aid and maintenance aid explained.

Figure 1:
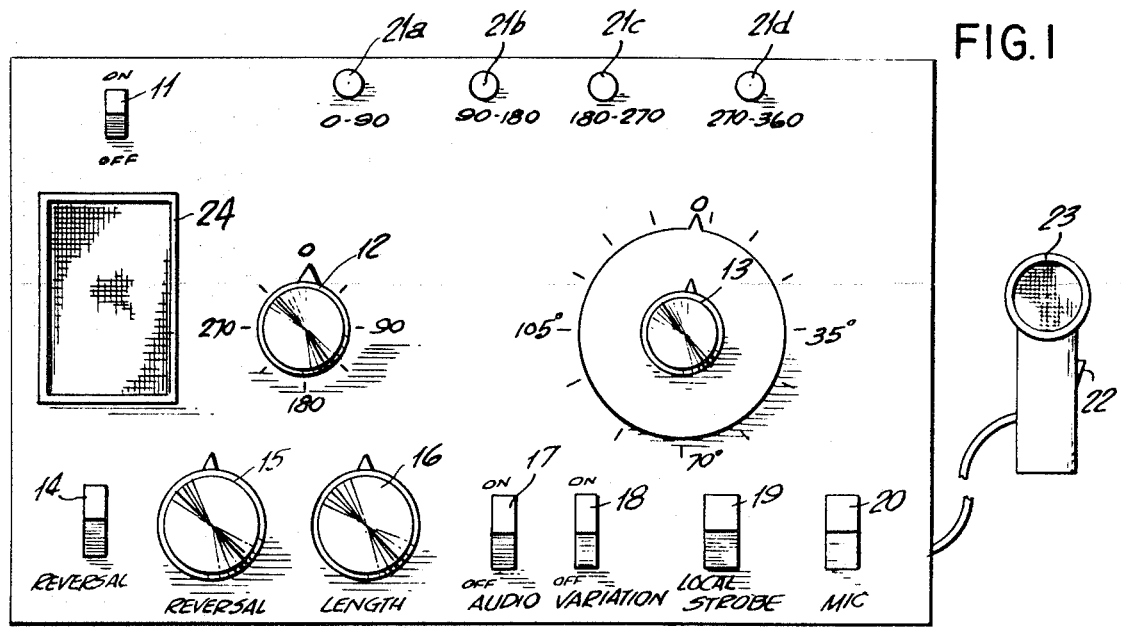
FIG. 1 is a front plan view of the testing and instructing device of the present invention.

The simulator 10 controls are shown in FIG. 1. The on-off switch 11 is operable when the local remote switch of the directional finder "d.f." receiver is in the local position. The main bearing control 12 moves the strobe of the indicator 360° in 45° steps when the preferred phasing method is used. An alternative is the use of a hemholtz coil which moves the strobe. The vernier strobe control 13 moves the strobe approximately 150° in azimuth. The strobe reversal switch 14 reverses the strobe direction by 180°. The reversal control 15 shortens the strobe gradually to zero and then it increases the strobe in opposite direction to the full strobe, for a total reversal of 180°. The strobe length control 16 varies the strobe from no strobe to a full strobe length.

The strobe audio control 17 controls the amount of audio mixed with the strobe. This causes strobe fluctuation at an audio rate and simulates adverse reception conditions. The strobe variation control 18 causes the strobe to wander, which is a simulation of an adverse condition. The strobe is mixed with a 200 cycle oscillator signal, the output of which is slightly variable in frequency. The local strobe switch 19 permits the bearing to be viewed at the local indicator only. The local microphone switch 20 permits audio, over loudspeaker 24, and strobe information to be received at the remote indicator. Switch 22 permits microphone 23 to provide audio instructions to the remote indicator. When switch 20 is released, it permits the audio to be received from the remote indicator. The colored lights 21 are operated by the azimuth pushbutton switch 22 and show the quadrant selected.

When the simulator is used in conjunction with an FM generator or FM transmitter, all controls are operable. The audio control will adjust the audio to the reactance circuit of the FM generator or FM transmitter. This will produce an audio output from the d.f. receiver in much the same manner as the d.f. receiver receives audio from aircraft.

Figure 2:
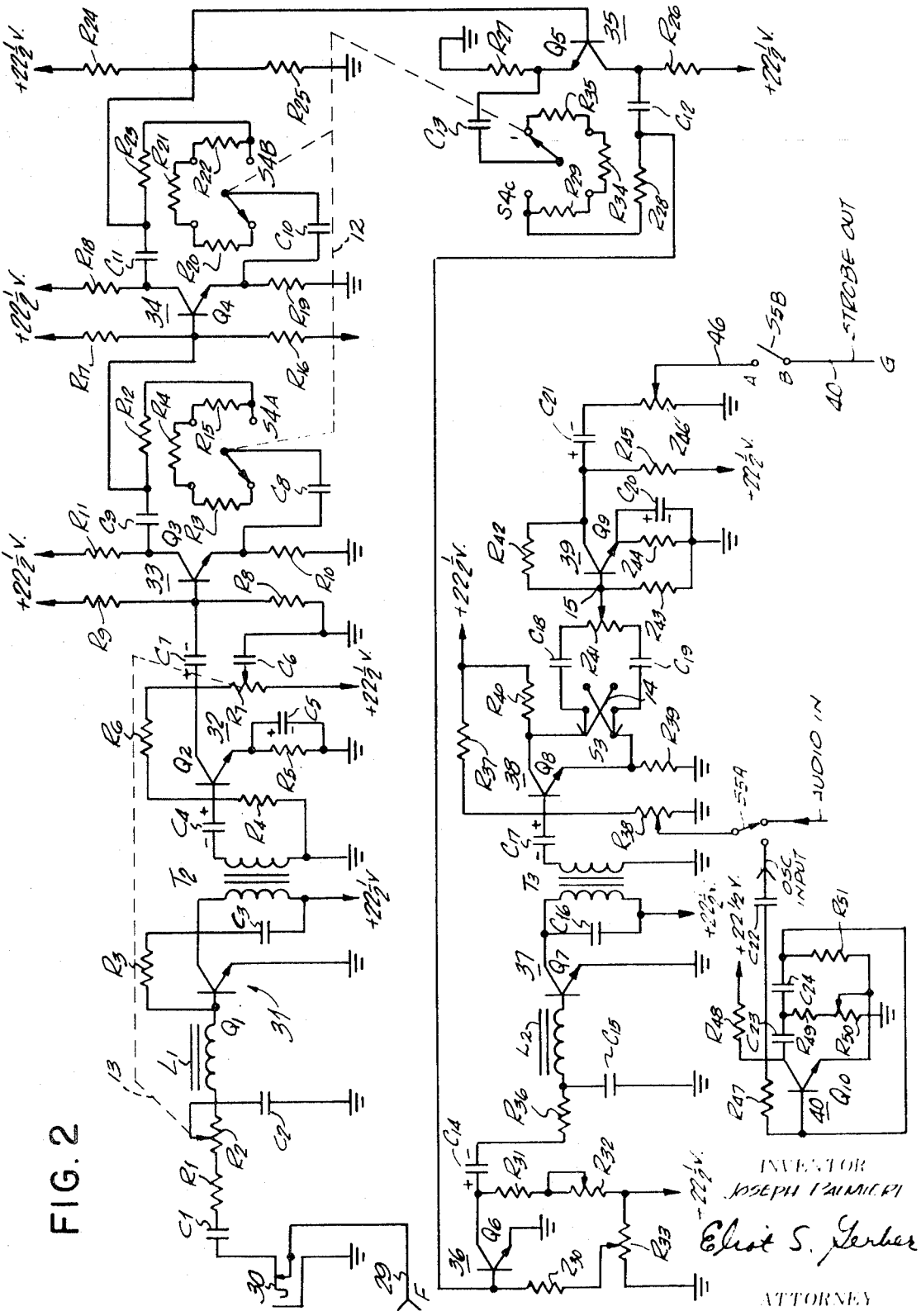
FIG. 2 is a schematic diagram of its circuit.

The detailed circuit is shown in FIG. 2. The general portions of the circuit are labeled by 31 through 40. These are functional terms which indicate the purpose of each portion of the overall circuit. The female connector 29 is connected to a selected portion within the d.f. receiver. The male connector 30 plugs into it when the simulator is to be used. A 25.6 Hz. sine wave oscillator which is part of the local indicator 60 initiates the signal that drives the square wave frequency divider and binary counter circuits o of the local indicator 60. The input 30 of simulator 10 will operate from any connection point 29 the frequency dividers of the binary counter section, preferably the 200 Hz. frequency divider is utilized.

When the signal input to the simulator 10 is derived from any of these points, other than at 200 cycles, a frequency division is required. The first vernier phase shifter 31 has its variable resistor R2 connected to the vernier dial 13 and provides a fine control for phase-shifting of the input signal.

The amplifier and vernier phase shifter 32 has its variable resistor R7 and R7 connected to vernier dial 13. There are three-phase shift networks 33, 34 and 35, in series, each of which shifts by 120°. These are connected to the dial 12. A limiter 36 presents clipped waveforms to the square-to-sine wave converter 37. A strobe mixer and strobe reversal stage 38 includes a switch S5, connected to audio switch 17, to mix in an audio signal. The switch S3, connected to reversal switch 14, provides a 180° reversal of the strobe. A 200-cycle oscillator 40 may, by means of switch S5 (operated by variation switch 18) be added to the strobe signal. The signal is amplified in strobe amplifier 39 and the output, on line 40, is connected to the indicator section of the system. The output of the simulator on line 40 is a synchronized 200-cycle waveform. The shape waveform may vary from square to triangular to sine. All these waveforms will produce locked strobes (bearing information).

The 200-cycle signal, on line 40 of the simulator, is used to frequency modulate an FM generator or transmitter. The FM signal output is used for maintenance RF checks to the doppler d.f. receiver. The 200-cycle output of the simulator (on line 40) can alternatively be fed back into the data extractor portion of the d.f. receiver; however, this omits the RF portion of the doppler d.f. receiver. Both methods produce bearing information (strobes) to the doppler d.f. indicators.

The following is a chart giving the values of the listed components, but such values are given by way of example only.

| | | |
|---|---|---|
| C1____ .33 mfd. | R1____ .5 meg. | R27__ 4.7K. |
| C2____ .1 mfd. | R2____ 1.5 meg. pot.[2] | R28__ 500 ohms. |
| C3____ .33 mfd.[1] | R3____ 470K. | R29__ 1K. |
| C4____ 10 mfd., 25 v. | R4____ 47K. | R30__ 10K. |
| C5____ 10 mfd., 25 v. | R5____ 470 ohms. | R31__ 2.7K. |
| C6____ .047. | R6____ 100K. | R32__ 10K pot. |
| C7____ 10 mfd., 25 v. | R7____ 4.7K pot. | R33__ 1 meg. pot. |
| C8____ .33 mfd. | R8____ 47K. | R34__ 4.7K. |
| C9____ .33. | R9____ 100K. | R35__ 6.8K. |
| C10____ .33. | R10___ 4.7K. | R36__ 1 meg. |
| C11____ .33. | R11___ 4.7K. | R37__ 100K. |
| C12____ .33. | ½12___ 500 ohms. | R38__ 50K pot. |
| C13____ .33. | R13___ 6.8K. | R39__ 4.7K. |
| C14____ .1. | R14___ 4.7K. | R40__ 4.7K. |
| C15____ .1. | R15___ 1K. | R41__ 25K pot. |
| C16____ .1. | R16___ 47K. | R42__ 100K. |
| C17____ 10 mfd., 25 v. | R17___ 100K. | R43__ 47K. |
| C18____ .33. | R18___ 4.7K. | R44__ 330 ohms. |
| C19____ .33. | R19___ 4.7K. | R45__ 6.7K. |
| C20____ 10 mfd., 25 v. | R20___ 6.8K. | R46__ 25K pot. |
| C21____ 10 mfd., 25 v. | R21___ 4.7K. | R47__ 470K. |
| C22____ .047 | R22___ 1K. | R48__ 3.3K. |
| C23____ .047. | R23___ 500 ohms. | R49__ 4.7K. |
| C24____ .047. | R24___ 100K. | R50__ 5K pot. |
| | R25___ 47K. | R51__ 4.7K. |
| | R26___ 4.7K. | |

[1] Size dependent on inductance of T2.    [2] Ganged with R7.

NOTE: Q1 thru Q10 all 2N697; all resistors ½ watt; T2 same as T3; T3 line to grid audio transformer, primary 100K, secondary 500K; L1 and L2 Arrgonet 230 windings in series; S3 strobe reversal switch; S4-4-pole 4-position switch; S5A and S5B are switches.

The simulator 10 contains a bearing producing and phase-shifting network and uses a two-way audio system with two microphones and two speakers. It is powered through a plug connected to the receiver or indicator portion of the doppler d.f. equipment.

Figure 3:
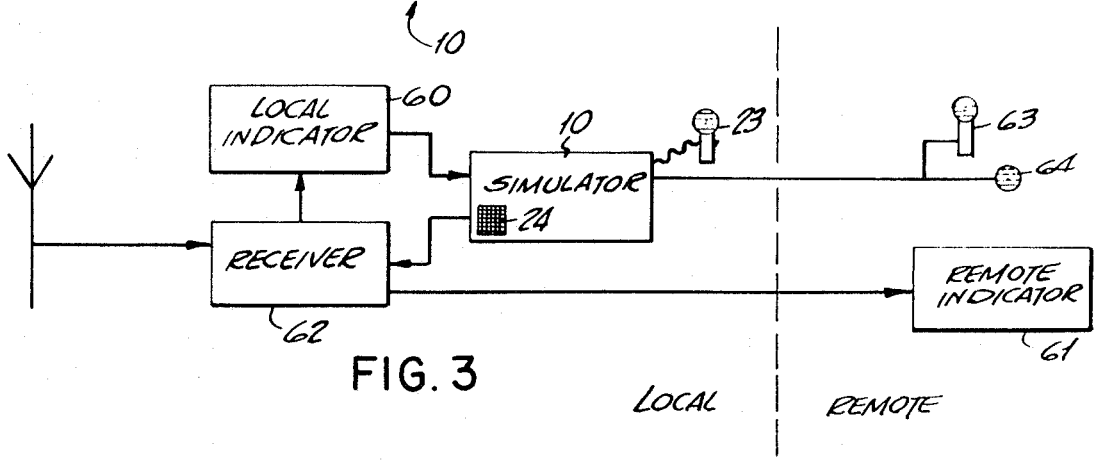
FIGS. 3 and 4 are block schematic diagrams of two systems using the device of the present invention.

With normal doppler d.f. operation (without the simulator) bearing information (strobes) are seen simultaneously on both the local 60 and remote 61 indicators (see FIG. 3). The controllers receive bearing information on the remote indicator. The local indicator 60 is usually located above the receiver 62.

Maintenance personnel controls the operation of the remote indicator through a local-remote switch. This switch is located in the receiver portion of the doppler d.f. The simulator 10 will operate only when the local-remote switch of the receiver is in the local position. This is a safety feature because it assures rapid return of normal d.f. operation to the controllers, should the need arise. When the simulator 10 is connected to the d.f. receiver and the switch is in the local position, the simulator can then be energized with its own on-off switch 11. Removing the simulator connecting plug from the receiver 62 when the local-remote switch is in its local position leaves the doppler d.f. equipment in a normal locating operating status.

The operation of the simulator will be described as a training aid and then as a maintenance aid.

As a maintenance aid the simulator 10 will restore strobes (visual indication) to an RF portion of the doppler d.f. An FM generator has its input connected to line 40 of the simulator 10. The simulator 10 supplies the frequency deviation for the FM generator. The output of the FM generator provides the signal frequency for the receiver portion being checked.

The use of the simulator as a maintenance aid presents distinct advantages. The doppler d.f. is a visual system and so visual means (strobe restoration) should be used to check it. At the present time maintenance checks for the d.f. receiver are accomplished with an AM generator. However, that method has the following disadvantages: (1) the AM generator does not produce strobes with the receiver antenna disconnected, and (2) portions of the doppler d.f., such as the time domain filter, are turned off during checking because the time domain filter generates approximately 10 db. of noise and that noise interferes with sensitivity checks.

In contrast, the method of the present invention, using simulator 10 and the FM generator, provides true visual checks (strobe restoration). All units of the d.f., including the time domain filter, are left on. The simulator 10, working in conjunction with an FM generator, restores strobes and test point information formerly lost when the antenna was disconnected from the d.f. receiver.

The simulator 10 is fed to the reactance portion of the FM generator. The FM generator is tuned to the receiver circuit involved. Strobe restoration is used as a standard sensitivity check. Checks can be made to the first five RF portions of the d.f. equipment using the following procedure:

1. All channels in the UHF-VHF receiver front end are checked with the antenna of the receiver disconnected;
2. The first IF, which is tuned to 38 MHz., is checked;
3. The second IF, which is tuned to 2.57 MHz., is checked;
4. The third IF, which is tuned to 2.57 MHz., is checked;
5. The fourth IF, which is tuned to 472.5 Hz., is checked;
6. The FM generator is tuned to discriminator input and discriminator checks are conducted;
7. The center frequency of the FM generator can be moved above and below the receiver response curve with the loss of the strobe at either end of the curve as an indication of bandwidth. This also provides bandwidth checks to any of the first five RF sections;
8. The antenna coaxial cable is checked by disconnecting the receiver antenna. The FM generator is then terminated into the receiver. The output control of the generator is advanced until a full strobe covers the indicators. The generator is disconnected, the antenna coaxial cable reconnected. The cable is then removed from the antenna side. The generator is fed into the coaxial line, and the output of the FM generator is advanced until the strobe is restored. The difference between the signal at the receiver input and the signal required at the antenna side of the coaxial cable is then computed.
9. Strobe flutter is caused by excessive modulation and/or poor signal strength. The oscillator control of the simulator is advanced until strobe flutters or the output of the FM generator is reduced until strobe flutters. This will give an idea of what is required for a steady strobe.
10. Strobe length may be checked with the strobe gain control. The percentage of 200-cycle signal fed to the reactance modulator of the FM generator will vary strobe length.

The following checks may be performed using the simulator and without the FM generator. The simulator is fed to the input of the data extractor portion of the d.f. receiver and the receiver RF gain control is placed at zero with the squelch and AGC off.

1. For the data extractor check, the output of the simulator is connected to TP.39 in the Servo Corp. receiver and a strobe will be developed through the data extractor to the indicators.
2. For indicator checks, a strobe is developed at the indicators when the output of the simulator is connected to TP.24 in that receiver.
3. The strobe length is checked by adjusting the length by the gain control of the simulator.
4. Strobe variation is checked by mixing excessive audio, mixed with 200 cycles, which is controlled by the gain control of the simulator.
5. Alignment between indicators may be checked and every degree aligned. Because the remote indicator is a slave to the local indicator, an error curve can be made which will show differences in azimuth between those indicators.

Students use the remote indicator 61 for training. They have a microphone 63 and speaker 64 and utilize the remote indicator 61 for viewing the bearings (see FIG. 3).

The instructor controls the audio and bearings produced by the simulator by operation of the controls of the simulator 10. Through switching arrangements in the simulator 10 the instructor selects a bearing which is viewed at the local indicator 60, for example, he turns dials 12 and 13. The simulator and its controls are not seen by the students in their remote position. When the bearing has been properly set by the instructor, he keys his microphone 23 using key (switch) 22 on microphone 23 (see FIG. 1). This automatically presents the same bearing information to both indicators 60 and 61 and also supplies audio to the remote position. The students at the remote position then request bearing changes which the instructor hears on speaker 24. These are set up by the instructor and are not viewed by the student until they hear the instructor's commands, which he gives over microphone 23.

Figure 4:
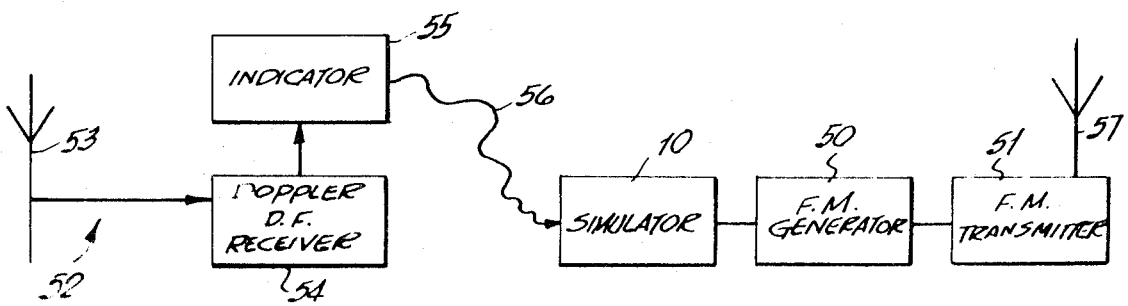

Strobes may also be developed from remote points using the FM technique of the present invention, as shown in FIG. 4. The simulator 10 and FM generator 50 and FM transmitter 51 are located at some remote point. The doppler d.f. equipment 52 is operated normally with its antenna 53 connected to the receiver 54. Synchronization signals are taken from the local indicator 55 and are sent, by radio or wire 56, to the location of the remote simulator and FM generator 50. The output of the FM transmitter 51 is connected to an antenna 57 which may be located near the doppler d.f. antenna 53 or may be placed miles away. The power output of the FM generator or FM transmitter is adjusted to produce a strobe at the indicator of the doppler d.f. equipment. Strobe rotation of up to 360° may thus be obtained from the remote point. This type of remote operation is valuable in determining proper doppler d.f. operation, for example, the directional accuracy of the antenna.

I claim:

1. A maintenance and training simulator for a doppler radio frequency direction finder system having an antenna scanning frequency, said system utilizing an antenna, receiver and local and remote scope indicators, the simulator including an input adapted to be connected to a position in the system so that its input signal is synchronized with said antenna scanning frequency, a variable phase shift network connected to said input, means connected to said phase shift network and controllable by an operator to vary said phase, an amplifier connected to said phase shift network and having an output.

2. A simulator as in claim 1 and also including an FM generator having an input and an output, said input being connected to the simulator output and said output being connected to said indicator to simulate a directional strobe.

3. A simulator as in claim 1 and also including means to transmit said antenna signal to said simulator when said simulator is remote from said system and an FM generator connected to the output of said simulator and an FM transmitter connected to said generator to test the said system by transmitting to its antenna a signal providing a controllable strobe.

4. A simulator as in claim 1 and also including an FM generator whose input is connected to the output of said simulator, means connecting the output of said generator to said indicator, wherein said simulator also includes a microphone and a loudspeaker is positioned at the remote indicator.

5. A simulator as in claim 1 and also including a phase reversal switch which operates from the phase shift networks to shift the phase 180°.

6. A simulator as in claim 1 wherein said control means includes a first dial to select the phase quadrants and a second vernier type dial for the fine selection of phase.

7. A simulator as in claim 1 wherein said input signal to the simulator is a square wave and said simulator includes a circuit connected in series before said phase shift network to convert said square waves to sine waves.

* * * * *